United States Patent [19]

Aktor et al.

[11] Patent Number: 5,635,073
[45] Date of Patent: Jun. 3, 1997

[54] METHOD FOR THE PURIFICATION OF METAL-CONTAINING AQUEOUS MEDIA AND METHOD OF PREPARING AN ADSORBENT

[75] Inventors: Henrik Aktor, Brønshøj; Terkel C. Christensen, Roskilde, both of Denmark

[73] Assignee: Krüger AS, Søborg, Denmark

[21] Appl. No.: 403,713

[22] PCT Filed: Sep. 16, 1993

[86] PCT No.: PCT/DK93/00297

§ 371 Date: Apr. 12, 1995

§ 102(e) Date: Apr. 12, 1995

[87] PCT Pub. No.: WO94/06717

PCT Pub. Date: Mar. 31, 1994

[30] Foreign Application Priority Data

Sep. 18, 1992 [DK] Denmark ................................ 1153/92
Sep. 18, 1992 [DK] Denmark ................................ 1154/92

[51] Int. Cl.⁶ .......................................................... C02F 1/62
[52] U.S. Cl. ...................... 210/714; 210/720; 210/721; 210/722; 210/912; 210/913
[58] Field of Search ............................ 210/721, 722, 210/714, 713, 712, 912, 913, 720

[56] References Cited

U.S. PATENT DOCUMENTS

| 4,014,787 | 3/1977 | Shorr. | |
|---|---|---|---|
| 4,465,597 | 8/1984 | Herman et al. | 210/713 |
| 4,507,207 | 3/1985 | Verhoeve et al. | 210/714 |
| 5,013,453 | 5/1991 | Walker | 210/722 |

FOREIGN PATENT DOCUMENTS

| 0476773 | 3/1992 | European Pat. Off. | 210/714 |
|---|---|---|---|
| 16590 | 10/1984 | Japan . | |
| 61091 | 4/1985 | Japan | 210/714 |
| 09192 | 10/1989 | WIPO . | |

Primary Examiner—Neil McCarthy
Attorney, Agent, or Firm—Rhodes, Coats & Bennett, L.L.P.

[57] ABSTRACT

A method for the removal of metal from a metal-containing aqueous medium wherein the aqueous medium is passed through a particulate carrier material in the presence or ferrous iron and an oxidant and at such velocity and in such direction that the carrier material particles are fluidised in the aqueous medium and wherein metal-containing coatings are formed on the surfaces of the carrier material particles and wherein the particles thus coated are separated from the aqueous medium. A method for the production of iron oxyhydroxide-containing adsorbent wherein the carrier material particles are fluidised in an aqueous medium in the presence ferrous iron and an oxidant so as to form iron oxyhydroxide coatings on the particles and wherein the particles thus formed are separated from the aqueous medium.

16 Claims, 2 Drawing Sheets

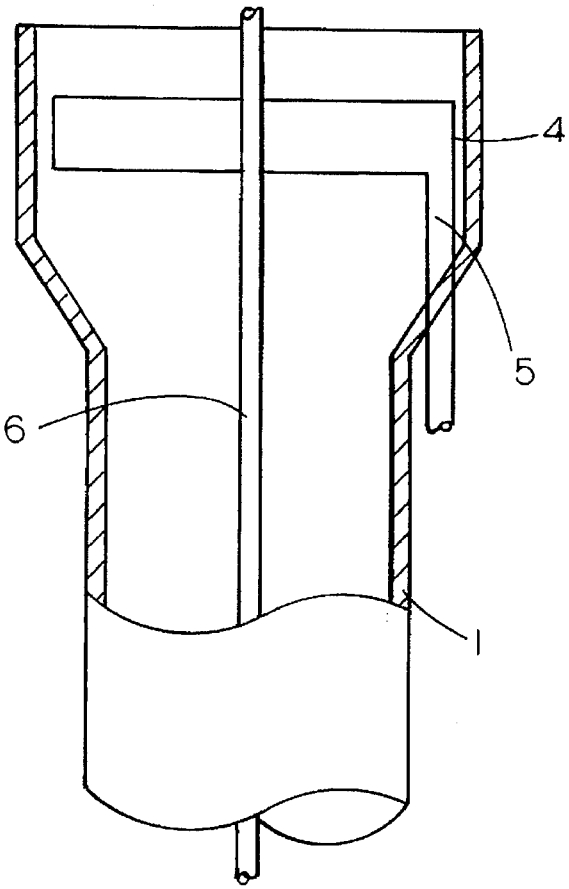
Fig.1
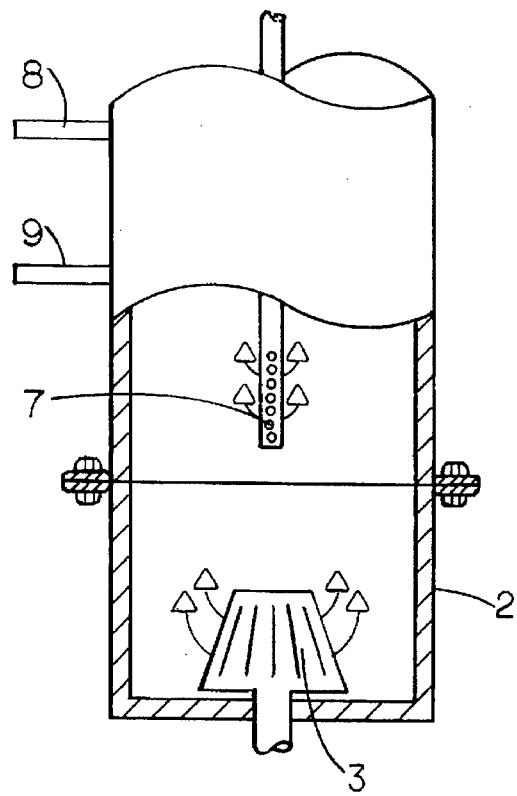

METHOD FOR THE PURIFICATION OF METAL-CONTAINING AQUEOUS MEDIA AND METHOD OF PREPARING AN ADSORBENT

FIELD OF THE INVENTION

The present invention relates to a method for the removal of metal from a metal-containing aqueous medium wherein the aqueous medium is contacted with a particulate carrier material so as to form a metal-containing coating on the carrier material particles and wherein the coated carrier material particles are separated from the aqueous medium.

BACKGROUND OF THE INVENTION

Certain types of waste water, such as waste water from the galvano-industry, the wood impregnation industry, the paint and lacquer industry, power plants and shipyards, as well as the ground water polluted with waste products from deposits of solid waste, contain considerable amounts of heavy metals.

In conventional mechanical/biological or chemical purification of heavy metal-containing waste water the major portion of such heavy metals can be removed by precipitation, but the known purification methods result in the formation of sludge with such high contents of heavy metals that the sludge cannot be disposed of in a usual manner. This leads to increased operation costs for conventional purification plants.

Other water types, such as oxygen-free ground water and acid waste water types from metal-machining industries, contain considerable amounts of dissolved ferrous iron ($Fe^{2+}$).

Conventional treatment (purification) of ferrous iron-containing water types comprises addition of an oxidant, such as atmospheric air, pure oxygen, chlorine or hydrogen peroxide. Hereby trivalent iron (ferric iron, $Fe^{3+}$) is formed which, due to its poor solubility in water, is precipitated in the form of iron oxyhydroxide which can be separated from the water phase by sedimentation and/or filtration. In order to improve the separation of the iron oxyhydroxide it is known to add a polyelectrolyte and/or inert carrier materials to the water.

Various alternative purification methods have been developed with the object of reducing the content of heavy metals in aqueous media of the type disclosed above to acceptable levels, i.e. to below 0.5 mg/l.

One such known purification method consists in the heavy metal-containing aqueous medium contacting an adsorbent of amorphous iron oxyhydroxide at a pH-value of 6-7 whereby the heavy metals contained in the aqueous medium are bonded to the surface of the amorphous iron oxyhydroxide from which they are subsequently removed by eluation so as to form highly concentrated solutions of the removed heavy metals, cf. M. Edwards and M. M. Benjamin: Adsorptive filtration using coated sand, a new approach for treatment of metal bearing wastes. J. WPCF, 61, (1989), pp. 1523-1533.

It is also known that precipitated iron oxyhydroxide has a catalytic effect on the oxidation of ferrous iron, cf. U. Hasselbarth and D. Lutermann: Die Biologische Enteisenung und Entmanganung vom Wasser, 38 (1971), pp. 233 and A. Hult: Filtration of Iron During and After Oxidation. Effluent and Water Treatment, J., 13, (1973), pp. 209-215. This catalytic effect is due to fact that ferrous iron is adsorbed onto the surface of iron oxyhydroxide and in this position it is oxidized to ferric iron which hydrolyses to iron oxyhydroxide, cf. H. Tamura, K. Goto and M. Nagayama: The Effect of Ferric Hydroxide on the Oxygenation of Ferrous Ions in Neutral Solutions. Corrosion Science, 16 (1976), pp. 197-207 and W. Sung and J. J. Morgan: Kinetics and Product of Ferrous Iron Oxygenation in Aqueous Systems. Environ. Sci. & Technol., 14, (1980), pp. 561-568.

JP patent publication No. 59-016590 discloses a method for the purification of heavy metal-containing waste water. In this method magnetite sludge is added to the waste water, the particles of said sludge being coated with an iron oxyhydroxide layer. A base is subsequently added and the mixture is stirred. Hereby the heavy metals are adsorbed onto the iron oxyhydroxide-coated magnetite particles. Following precipitation of the particles thus obtained, the major portion (about 80%) of the water is separated off and the remaining portion as well as the precipitated particles are subjected to various treatments whereby magnetite and ferrite particles coated with a surface layer of iron oxyhydroxide are formed. Following separation of said particles from the aqueous phase, the particles are suitable for use in a renewed water purification operation.

It is the object of the present invention to provide a continuous method for removing metals and in particular heavy metals from aqueous media containing the same. It is also the object of the invention to facilitate the separation of the metal-coated carrier material particles from the purified aqueous medium.

SUMMARY OF THE INVENTION

The method according to the invention is characterized in that the aqueous medium is passed through the particulate carrier material in the presence of dissolved ferrous iron and an oxidant, and at such velocity and in such direction that the carrier material particles are fluidised in the aqueous medium.

When ferrous iron contacted with the surface of the carrier material particles in the presence of an oxidant, ferrous ions are, as mentioned above, adsorbed onto said surfaces and the adsorbed ferrous ions are subsequently oxidised to form ferric ions which, by reaction with water (hydrolysis), are rapidly converted into iron oxyhydroxide. The thus in situ-formed iron oxyhydroxide-layer acts as adsorbent for or may react with the metals contained in the aqueous medium which metals are thus bonded to the carrier material particles.

According to the invention said reactions occur, as mentioned, while the carrier material particles are maintained fluidised (suspended) in the aqueous medium so that the surfaces of the carrier material particles are continuously supplied with new ferrous ions which are hence allowed to be adsorbed thereon. As a result of the simultaneous continuous supply of oxidant to said surfaces the thus implemented oxidation and subsequent hydrolysis will result in the formation of surface coatings of iron oxyhydroxide on which further metal ions may be adsorbed.

As a consequence of this continuous formation of a new active surface, the thickness of the carrier material particle coating will rapidly increase. As a consequence of the carrier material particle size and density, the separation of the carrier material from the water phase can easily be carried out continuously.

A further advantage obtained by effecting the formation of the coatings on the carrier material particles while the latter are maintained fluidised is that the coatings on said particles are allowed to grow unimpeded in all directions.

Thus, in the method according to the invention particles can be produced having dense coatings with a comparatively high density and high strength.

The density obtained may primarily be ascribed to the coatings being formed in a manner which is analogous with crystal growth, i.e. that the formation of the coatings is not based on particle collisions (flocculation) which is known to provide a less coherent reaction product.

The properties of the adsorbent particles formed may be influenced by suitable choice of operation parameters, such as carrier material, pH-value, ferrous ion concentration, alkalinity, temperature, oxidant and the period during which the particles are maintained fluidised.

Preferred carrier materials include inert materials, e.g. mineral grains, such as sand grains, but metallic carrier materials, such as iron particles, may also be used.

Thus, when using sand grains as carrier material coated particles are obtained which have a density of above 2 kg/l which means that the subsequent separation of coated particles from the aqueous phase may easily be carried out with the use of conventional separation methods, e.g. decantation, centrifugation and the like, to form a final product having a form which is suitable for further handling.

Preferably, the carrier material particles have a mean diameter of from 0.1 to 2.5 mm and the pH-value of the aqueous medium is preferably adjusted within the range of 2.5 and 8.5, pH-values in the upper portion of this range being particularly preferred since the adsorption of ferrous ions and thus the coating formation rate increases with increasing pH-values.

The reaction is typically carried out at temperatures of from 5° to 20° C.

The desired amount of ferrous ions is preferably provided by addition of a solution of one or more soluble ferrous salts to the aqueous medium. Examples of such salts are ferrous sulphate and ferrous chloride.

An oxidant which is dissolved in the aqueous medium is preferably used in the method according to the invention. Examples of such oxidants include oxygen, ozone, chlorine, chloroxides, hydrogen peroxide, potassium permanganate, chromates and dichromates.

When using carrier material particles having a density of above 1 $g/cm^3$, the fluidisation is preferably effected by passing a stream of aqueous medium upwards through a zone containing the carrier material particles, the velocity of said flow being adapted to the particle size and density of the particles. When the particle density is above 1 $g/cm^3$, the aqueous medium is passed downwards through said zone.

The treatment of the aqueous medium with carrier material particles, ferrous iron and oxidant is preferably carried out in a reactor wherein the aqueous medium is carried upwards through the reactor in a uniform stream at such velocity that a fluidised zone of carrier material particles is formed, and wherein the aqueous solution of ferrous iron is introduced into and distributed in the fluidised zone.

The method according to the invention may be used for the removal of i.a. the following heavy metals: mercury, lead, arsenic, chromium, copper and selenium, from aqueous media containing such heavy metals in dissolved form.

The method according to the invention is particularly suitable for the removal of ferrous iron from aqueous media containing ferrous ions. Examples of such water types are acid drainage water and iron-rich ground water. These types of water give rise to the formation of large amounts of sludge when purified by conventional purification methods.

The treatment of an aqueous medium by the method according to the invention results in the continuous formation of iron oxyhydroxide surface coatings on which additional ferrous ions can be adsorbed which ions under the influence of the oxidant and water are continuously converted to new surface coatings of iron oxyhydroxide and so forth.

The method according to the invention is also particularly suitable for the removal of dissolved hexavalent chromium [Cr(VI)] from aqueous media and in particular industrial waste water containing the same.

The treatment of chromium-containing waste water by the method according to the invention results in an adsorption of ferrous iron as well as chromium(VI) onto the surfaces of the carrier material particles so that the adsorbing Cr(VI) acts as an oxidant for ferrous iron which is thus converted to ferric iron [(Fe(III)] and at the same time Cr(VI) is reduced to Cr(III). By a continued hydrolysis of the Fe(III) and Cr(III) thus obtained, especially coatings of Fe(III)- and Cr(III)-oxyhydroxide are formed on the carrier material particles. These coatings are very dense and have a comparatively low content of water.

The mixture of Fe(III)- and Cr(III)-oxyhydroxide continuously form a new active surface on which an adsorption of ferrous iron and chromate may occur thereby allowing the process to continue. In case of ferrous iron-addition, it is typically effected at a molar ratio (Fe/Cr) of about 3 corresponding to the theoretically necessary amount of ferrous iron for the reduction of Cr(VI) into Cr(III).

The invention further relates to a method for the production of an adsorbent which is useful for use in the removal of metals from aqueous media containing the same and wherein iron oxyhydroxide is bonded to the surface of a carrier material, which method is characterized in that an aqueous medium containing dissolved ferrous iron and an oxidant is passed through the particulate carrier material at such velocity and in such direction that the carrier material particles are fluidised in the aqueous medium and that dense coatings of iron oxyhydroxide are formed on the carrier material particle surfaces and that the particles thus coated are separated from the aqueous phase.

BRIEF DESCRIPTION OF THE DRAWINGS

The invention will now be described in further detail with reference to the drawings in which FIG. 1 schematically shows a reactor for use in carrying out the method according to the invention

DETAILED DESCRIPTION OF THE PREFERRED EMBODIMENTS

Figure 2:
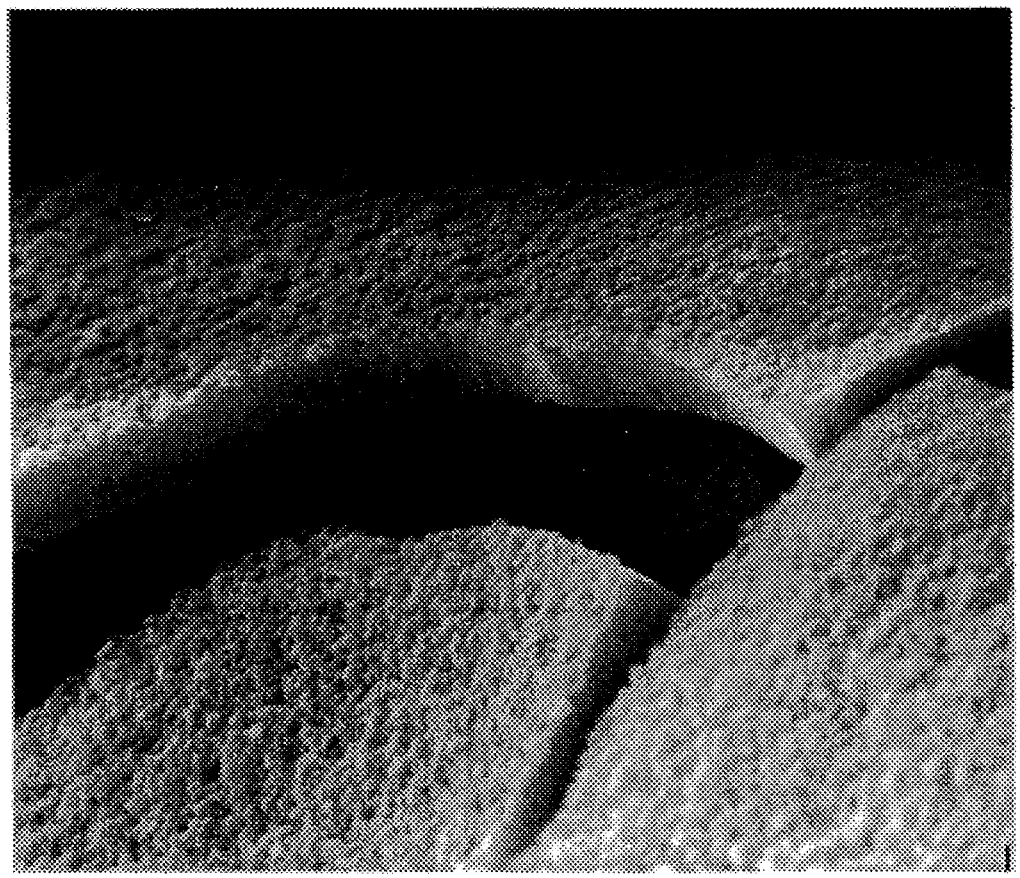
FIG. 2 is an electron microphotography (enlargement: 6000 times) of an iron-coated particle formed by the method according to the invention and after it has been dried so as to generate cracks in the surface coating.

In the drawing 1 denotes a cylindrical reactor having a bottom portion 2 wherein a slit nozzle 3 is arranged for the supply of a metal containing aqueous medium containing an oxidant. At its upper end the cylindrical reactor 1 is provided with an expanded portion 4 wherein an outlet 5 is arranged in the form of an overflow. A supply conduit 6 for an aqueous solution of dissolved ferrous salts is provided proximately to the axis of the cylindrical reactor, and the supply conduit 6 is, at its lower end, connected to a diffuser 7 for the distribution of the ferrous salt-solution in the lower reactor portion. The reactor further comprises a number of outlets, two of which are shown, viz. 8 and 9. The reactor 1 contains a particulate carrier material (not shown) which before the use of the reactor, forms a layer in the bottom portion 2 thereof.

During operation of the reactor shown, an aqueous medium is introduced into the bottom portion 2 of the reactor through the slit nozzle 3 at such velocity that a fluidised layer of carrier material particles is formed in the lower portion of the reactor and so that the carrier material particles are prevented from being passed upwards to the expanded reactor portion 4 where the flow rate of the aqueous medium is lower than in the lower portion of the reactor 1. This allows aqueous medium without substantial content of carrier material particles to be discharged through the outlet 5.

While maintaining the carrier material particles suspended in the lower portion of the cylindrical reactor 1, an aqueous solution of one or more water-soluble ferrous salts is introduced through the supply conduit 6, which solution is distributed over the reactor cross section by means of the diffuser 7.

As metal coatings of a suitable thickness are formed on the carrier material particles, they are removed through the outlets 8 or 9.

The adsorbent particle shown in FIG. 2 consists of a quartz grain with a particle diameter of 0.19 mm and having a surface coating of iron oxyhydroxide. As will appear from FIG. 2 the surface coating is very uniform and dense. The latter property means that it has a comparatively high density and high strength.

The invention will now be further described with reference to the following examples which were carried out by means of a reactor of the type shown.

EXAMPLE 1

The lower portion of the reactor used had an internal diameter of 100 mm and its total length was 1000 mm.

Oxygen-containing process water with an oxygen concentration of 40 mg $O_2$/l was supplied through the slit nozzle 3 in the bottom portion 2 of the reactor and was distributed over the cross section of the reactor 1 through a 100 mm thick layer of quartz sand having a grain diameter of 1.2–2.2 mm.

A concentrated solution of $FeSO_4 \cdot 7H_2O$ and $Na_2CO_3$ with a molar ratio of Fe to $CO_3$ of 1:6 was supplied to the reactor 1 through a PVC-conduit 6 and the diffuser 7 by means of a diaphragm pump (not shown).

Carrier materials of quartz sand and of three different particles sizes, viz. having mean grain diameters of 0.19, 0.25 and 0.62 mm, respectively, were used. The flow rates of the aqueous medium upwards through the reactor 1 was adapted to the carrier materials used and were 3, 6 and 20 m/h, respectively.

The residence time of the aqueous medium was varied by varying the volume of the fluidised quartz sand between 3 and 6 l.

In the tests Carried out the amount of supplied dissolved ferrous iron relative to the total amount of aqueous medium was varied between 20 and 165 mg/l.

Post-experimental tests were performed on the coatings formed on the quartz sand grains. The densities of the coatings were 3 kg (dry matter)/l of coating and the water content of the coatings following 24 hours of dripping off on filter paper at ambient temperature was measured to 20% (determined as the loss of weight after 24 hours of drying at 105° C.)

The amount of iron deposited on the carrier material particles compared to the total amount of iron supplied will appear from Table 1, and the amount of coating relative to the carrier material will appear from Table 2.

TABLE 1

| Mean particle diameter (mm) | Flow rate (m/h) | Fixed-bed volume (l) | Total Iron inlet (mg/l) | outlet % | |
|---|---|---|---|---|---|
| 0.19 | 3.3 | 6 | 134 | 6.6 | 5 |
| 0.19 | 2.9 | 5 | 165 | 6.4 | 4 |
| 0.19 | 3.4 | 3 | 138 | 19 | 14 |
| 0.25 | 6.3 | 6 | 71 | 21 | 29 |
| 0.25 | 6.3 | 6 | 69 | 11 | 16 |
| 0.62 | 20 | 6 | 20 | 11 | 53 |
| 0.62 | 21 | 6 | 21 | 12 | 59 |

As will appear from Table 1 the iron adsorption increases with decreasing flow rate of the aqueous medium.

TABLE 2

| Mean particle diameter (mm) | Test period days and nights (effective) (d) | Coating concentration (g Fe/kg of sand) |
|---|---|---|
| 0.19 | 4 | 29.5 |
| 0.19 | 7 | 51.2 |
| 0.19 | 10 | 83.3 |
| 0.25 | 6 | 41.5 |
| 0.25 | 9 | 56.1 |
| 0.62 | 7 | 21.1 |

As will appear from Table 2 the coating concentration increases drastically as with time,

EXAMPLE 2

The lower portion of the reactor used had an internal diameter of 100 mm and its total length was 1000 mm.

Chromium-containing water with chromium concentrations of from 1.5 to 2.2 mg/l was supplied through the split nozzle 3 and was evenly distributed over the reactor cross section through a 100 mm thick layer of quartz sand with a grain diameter of from 1.2 to 2.0 mm. The carrier material used was quartz sand with a mean grain diameter of 0.19. A concentrated solution of $FeSO_4 \cdot 7H_2O$ was introduced into the reactor through the conduit 6 and the diffuser 7. The chromium-containing water was introduced at a velocity of at least 3 m/h corresponding to an amount of 24 l/h whereby fluidisation of the carrier material was obtained.

Two series of tests were performed, for the first test series $K_2CrO_4$-added drinking water was used as chromium-containing water and for the second fly ash percolate.

The process conditions were varied by varying the pH-value, the concentration of dissolved oxygen in the chromium-containing water, the supply rate of chromium-containing water and the amount of added ferrous iron.

The data obtained are given i Table 3 (treatment of $K_2CrO_4$-added drinking water) and Table 4 (treatment of fly ash percolate).

TABLE 3

| $O_2$ content mg/l | pH value | Fe(II) in mg/l | Fe(II) out mg/l | FE total in mg/l | Fe-total out mg/l | Cr(VI) in mg/l | Cr(VI) out mg/l | Molar ratio of removed Cr to removed Fe | Darcy rate m/h | Residence time mins | Removed Cr % |
|---|---|---|---|---|---|---|---|---|---|---|---|
| 8.5 | 6.5 | 4.19 | 0.01 | 4.31 | 0.04 | 1.60 | 0.56 | 0.28 | 3.7 | 8.2 | 64.9 |
|  |  | 5.82 | 0.04 | 5.96 | 0.09 | 1.57 | 0.21 | 0.26 | 3.7 | 8.2 | 86.4 |
|  |  | 6.42 | 0.05 | 6.57 | 0.09 | 1.57 | 0.18 | 0.25 | 3.7 | 8.2 | 88.4 |
|  | 7.5 | 4.55 | 0.01 | 5.36 | 0.03 | 1.57 | 0.67 | 0.23 | 3.7 | 8.2 | 57.6 |
|  |  | 5.93 | 0.01 | 6.14 | 0.03 | 1.56 | 0.25 | 0.25 | 3.7 | 8.2 | 83.8 |
|  |  | 7.77 | 0.01 | 7.99 | 0.02 | 1.55 | 0.17 | 0.20 | 3.7 | 8.2 | 89.1 |
| <0.5 | 6.5 | 4.17 | 0.01 | 4.37 | 0.04 | 1.54 | 0.51 | 0.28 | 3.7 | 8.2 | 67.1 |
|  |  | 5.25 | 0.04 | 6.96 | 0.08 | 1.50 | 0.18 | 0.29 | 3.7 | 8.2 | 87.9 |
|  |  | 6.76 | 0.41 | 9.03 | 0.48 | 1.49 | 0.01 | 0.26 | 3.7 | 8.2 | 99.1 |
|  | 7.5 | 4.47 | 0.01 | 5.07 | 0.24 | 1.99 | 0.49 | 0.38 | 3.7 | 8.1 | 75.2 |
|  |  | 5.74 | 0.01 | 6.18 | 0.24 | 2.01 | 0.31 | 0.33 | 3.7 | 8.1 | 84.4 |
|  |  | 7.99 | 0.23 | 9.33 | 0.49 | 2.03 | 0.02 | 0.29 | 3.7 | 8.1 | 98.9 |
| 8.5 | 6.5 | 4.54 | 0.09 | 5.79 | 0.36 | 2.06 | 0.73 | 0.34 | 7.2 | 4.1 | 64.4 |
|  |  | 6.15 | 0.28 | 7.46 | 0.59 | 2.04 | 0.26 | 0.34 | 7.2 | 4.1 | 87.1 |
|  |  | 8.27 | 1.04 | 9.62 | 1.31 | 2.07 | 0.03 | 0.32 | 7.2 | 4.1 | 98.5 |
|  | 7.5 | 4.55 | 0.01 | 5.87 | 0.25 | 2.07 | 0.64 | 0.36 | 7.2 | 4.2 | 69.0 |
|  |  | 6.55 | 0.03 | 7.86 | 0.28 | 2.16 | 0.26 | 0.33 | 7.2 | 4.2 | 88.2 |
|  |  | 8.49 | 0.33 | 9.71 | 0.60 | 2.13 | 0.02 | 0.29 | 7.2 | 4.2 | 99.3 |
| <0.5 | 6.5 | 4.55 | 0.06 | 5.87 | 0.34 | 2.04 | 0.65 | 0.35 | 7.2 | 4.2 | 67.9 |
|  |  | 6.42 | 0.30 | 7.84 | 0.55 | 2.08 | 0.26 | 0.34 | 7.2 | 4.2 | 87.7 |
|  |  | 9.59 | 1.45 | 9.84 | 1.74 | 2.09 | 0.01 | 0.29 | 7.2 | 4.2 | 99.6 |
|  | 7.5 | 4.54 | 0.02 | 5.79 | 0.26 | 2.11 | 0.73 | 0.35 | 7.2 | 4.1 | 65.4 |
|  |  | 6.15 | 0.05 | 7.46 | 0.31 | 2.06 | 0.21 | 0.34 | 7.2 | 4.1 | 89.8 |
|  |  | 8.43 | 1.25 | 9.80 | 1.50 | 2.09 | 0.02 | 0.33 | 7.2 | 4.1 | 99.2 |

TABLE 4

| Fe(II) in mg/l | Fe(II) out mg/l | FE total in mg/l | Fe-total out mg/l | Cr(VI) in mg/l | Cr(VI) out mg/l | Molar ratio of removed Cr to removed Fe | Darcy rate m/h | Residence time mins | Removed Cr % |
|---|---|---|---|---|---|---|---|---|---|
| 2.98 | 0.03 | 3.05 | 0,06 | 0.88 | 0.08 | 0.31 | 3.8 | 8.0 | 90.9 |
| 3.34 | 0.09 | 3.44 | 0.12 | 0.87 | 0.02 | 0.30 | 3.8 | 8.0 | 97.7 |
| 3.59 | 0.11 | 3.67 | 0.15 | 0.87 | 0.02 | 0.28 | 3.8 | 8.0 | 98.0 |
| 2.98 | 0.21 | 3.03 | 0.29 | 0.87 | 0.08 | 0.32 | 6.0 | 5.0 | 90.8 |
| 3.50 | 0.35 | 3.57 | 0.43 | 0.84 | 0.06 | 0.28 | 6.0 | 5.0 | 92.5 |
| 3.86 | 0.50 | 3.91 | 0.58 | 0.84 | 0.02 | 0.28 | 6.0 | 5.0 | 98.1 |
| 2.69 | 0.09 | 2.75 | 0.13 | 0.84 | 0.20 | 0.28 | 8.0 | 3.8 | 75.6 |
| 3.00 | 0.23 | 3.05 | 0.32 | 0.82 | 0.08 | 0.30 | 8.0 | 3.7 | 89.7 |
| 3.30 | 0.45 | 3.41 | 0.51 | 0.82 | 0.03 | 0.31 | 8.0 | 3.7 | 95.7 |
| 8.88 | 0.81 | 9.18 | 0.88 | 0.82 | 0.007 | 0.11 | 3.0 | 10.0 | >99.9 |

In all tests the ph-value was 7.2, and the $O_2$- content of the chromium-containing water was 5 mg/l

EXAMPLE 3

The lower portion of the reactor used had an internal diameter of 100 mm and the total length thereof was 1000 mm.

Drinking water from "Københavns Vandforsyning" (the Copenhagen water supply) with the addition of an amount of sodium arsenate corresponding to between 0.15 and 1.0 mg of As(V)/l was supplied through the split nozzle (3) at the bottom portion (2) of the reactor and was distributed over the cross section of the reactor (1) through a 100 mm thick layer of quartz sand with a grain diameter of 1.2–2.0 mm.

A concentrated solution of $FeSO_4 \cdot 7H_2O$ was introduced into the reactor (1) through a PVC-conduit (6) and the diffuser (7) by means of a diaphragm pump (not shown).

A carrier material of quartz sand with a mean grain diameter of 0.19 mm was used. The flow rate for the aqueous medium upwards through the reactor (1) was adjusted to the carrier material used and was appr. 3 m/h.

In the tests performed the molar ratio of added amount of ferrous iron to arsenate, [Fe(II)]/[As(V)], was varied within the range of 3.5–10.

The amount of arsenic and iron removed will appear from Table 5. It appears from said table that purification degrees of above 99% may be obtained by addition of minor amounts of ferrous iron and that the concentration of iron in the outlet is acceptable.

TABLE 5

| Arsenic removal in a fluid-bed reactor | | | | | | |
|---|---|---|---|---|---|---|
| [As(V)] inlet (mg/l) | [AS(V)] outlet (mg/l) | [As(V)] % removal (mean) | [Fe]-total inlet (mg/l) | [Fe]-total outlet (mg/l) | [Fe]-total % removal (mean) | pH outlet |
| 0.147 | 0.051 | 65.3 | 0.603 | 0.116 | 80.7 | 7.22 |
| 0.181 | 0.054 | 70.2 | 0.650 | 0.145 | 77.7 | 7.21 |
| 0.144 | 0.035 | 75.7 | 0.565 | 0.116 | 79.5 | 7.42 |
| 0.142 | 0.049 | 65.5 | 0.552 | 0.093 | 83.1 | 7.44 |
| 0.160 | 0.055 | 65.6 | 0.572 | 0.088 | 84.6 | 7.32 |
| 0.155 | 0.046 | 70.3 | 0.562 | 0.083 | 85.2 | 7.36 |

TABLE 5-continued

Arsenic removal in a fluid-bed reactor

| [As(V)] inlet (mg/l) | [AS(V)] outlet (mg/l) | [As(V)] % removal (mean) | [Fe]-total inlet (mg/l) | [Fe]-total outlet (mg/l) | [Fe]-total % removal (mean) | pH outlet |
|---|---|---|---|---|---|---|
| 0.157 | 0.044 | 72.0 | 0.557 | 0.070 | 87.4 | 7.47 |
| 0.156 | 0.035 | 77.6 | 0.542 | 0.065 | 88.0 | 7.35 |
| 0.153 | 0.031 | 79.7 | 0.529 | 0.039 | 92.6 | 7.30 |
| 0.140 | 0.025 | 82.1 | 0.516 | 0.036 | 93.0 | 7.34 |
| 0.177 | 0.019 | 89.3 | 1.066 | 0.057 | 94.7 | 7.38 |
| 0.163 | 0.021 | 87.1 | 1.046 | 0.049 | 95.3 | 7.30 |
| 0.161 | 0.012 | 92.5 | 1.084 | 0.072 | 93.4 | 7.37 |
| 1.027 | 0.010 | 99.0 | 3.471 | 0.098 | 97.2 | |
| 1.069 | 0.009 | 99.1 | 6.392 | 0.096 | 98.5 | 7.35 |
| 1.117 | 0.014 | 98.7 | 3.049 | 0.062 | 98.0 | 7.27 |
| 1.377 | 0.046 | 96.7 | 3.494 | 0.103 | 97.1 | 7.32 |
| 1.348 | 0.037 | 97.3 | 3.542 | 0.072 | 98.0 | 7.30 |
| 1.307 | 0.029 | 97.8 | 3.590 | 0.124 | 96.5 | 7.32 |
| 0.910 | 0.013 | 98.6 | 3.900 | 0.261 | 93.3 | 7.32 |
| 0.931 | 0.026 | 97.2 | 3.993 | 0.238 | 94.0 | 7.31 |
| 1.110 | 0.015 | 98.6 | 3.906 | 0.160 | 95.9 | 7.29 |
| 1.011 | 0.034 | 96.6 | 3.823 | 0.148 | 96.1 | 7.28 |
| 1.047 | 0.005 | 99.5 | 7.725 | 0.502 | 93.5 | 7.24 |
| 1.042 | 0.005 | 99.5 | 7.458 | 0.567 | 92.4 | 7.29 |
| 1.011 | 0.002 | 99.8 | 7.237 | 0.305 | 95.8 | 7.40 |
| 0.979 | 0.003 | 99.7 | 7.561 | 0.215 | 97.2 | 7.30 |
| 0.969 | 0.004 | 99.6 | 7.476 | 0.202 | 97.3 | |
| 0.981 | 0.006 | 99.4 | 7.040 | 0.29 | 95.9 | 7.28 |

We claim:

1. A method for the removal of dissolved heavy metal ions from a metal-containing aqueous medium wherein the aqueous medium is contacted with a particulate carrier material so as to form a metal-containing iron hydroxide coating on the carrier material particles and wherein the coated carrier material particles are separated from the aqueous medium, the method comprising the steps of:
   (a) introducing a volume of carrier material particles into a reactor;
   (b) directing the metal-containing aqueous medium into the reactor in the presence of dissolved ferrous ions;
   (c) introducing an oxidant into the aqueous medium;
   (d) fluidising the carrier material particles in the reactor by passing the aqueous medium through the reactor at such a velocity and in such a direction as to fluidise the carrier material particles;
   (e) forming an iron oxyhydroxide coating on the carrier material particles by oxidizing the ferrous ions and hydrolyzing the resulting ferric ions;
   (f) adsorbing heavy metal ions onto outer surfaces of the carrier material particles; and
   (g) separating and removing the carrier material particles having the heavy metal ions adsorbed thereon from the aqueous medium.

2. The method according to claim 1, wherein a particulate inert material is used as the carrier material.

3. The method according to claim 2, wherein sand grains are used as the carrier material.

4. A method for the production of an iron oxyhydroxide-containing adsorbent wherein iron oxyhydroxide is bonded to the surface of carrier material particles, comprising the steps of: passing an aqueous medium containing dissolved ferrous iron and an oxidant through the carrier material particles at such velocity and in such direction that the carrier material particles are fluidised in the aqueous medium, forming dense coatings of iron oxyhydroxide in-situ on the carrier material particles, and separating the particles thus coated from the aqueous medium.

5. The method according to claim 1, wherein the carrier material particles have a mean diameter of from 0.1 to 2.5 mm.

6. The method according to claim 1, further comprising the step of maintaining a pH-value of from 2.5 to 8.5 in the aqueous medium.

7. The method according to claim 1, wherein the aqueous medium comprises one of the following group: process waste water, drinking water, and ground water.

8. The method according to claim 1, wherein the oxidant comprises one of the following group: oxygen, ozone, chlorine, chloroxide, hydrogen peroxide, sodium permanganate, chromates, and dichromates.

9. The method according to claim 1, wherein the dissolved metal ions are ferrous iron in the form of a ferrous salt selected from the group consisting of ferrous sulfate and ferrous chloride.

10. The method according to claim 1, wherein the dissolved metal ions comprise ferrous iron and chromium(VI), and further comprising the steps of: adsorbing the ferrous iron and the chromium(VI) on the carrier material particles; oxidizing the ferrous iron to ferric iron while simultaneously reducing the chromium(VI) to chromium(III); hydrolyzing the ferric iron and chromium(III); and forming a Fe(III)- and Cr(III)-oxyhydroxide coating on the carrier material particles.

11. The method according to claim 1, including the step of continuously removing from the reactor the carrier material particles having heavy metal ions adsorbed thereon.

12. The method according to claim 1, including the steps of oxidizing the metal ions adsorbed on the carrier material particles and hydrolyzing the oxidized metal ions to form a metal-containing hydroxide coating on the carrier material particles.

13. A method for the continuous removal of dissolved heavy metal ions from wastewater, comprising the steps of:
   (A) introducing a volume of carrier material particles into a reactor vessel;
   (b) introducing wastewater containing dissolved heavy metal ions into the reactor vessel in the presence of dissolved ferrous ions;
   (c) passing the wastewater through the reactor vessel at such a velocity and in such a direction as to fluidize the carrier material particles;
   (d) introducing an oxidant into the wastewater, said oxidant oxidizing the ferrous ions to ferric ion, hydrolyzing the ferric ion into iron oxyhydroxide thereby forming in-situ an iron oxyhydroxide coating on the outer surfaces of the carrier material particles;
   (e) adsorbing metal ions onto outer surfaces of the carrier material particles coated with said iron oxyhydroxide coating;
   (f) oxidizing the metal ions adsorbed on the carrier material particles;
   (g) hydrolyzing the oxidized metal ions to form a metal-containing hydroxide coating on the carrier material particles;
   (h) adsorbing additional metal ions on the metal-containing hydroxide coating, thereby increasing the thickness of the metal-containing hydroxide coating; and (i) continuously separating the coated carrier material particles from the wastewater, thereby removing the metal ions from the wastewater.

14. The method according to claim 13, wherein the dissolved metal ions comprise ferrous iron and chromium (VI), and further comprising the steps of: adsorbing the ferrous iron and the chromium(VI) on the carrier material particles; oxidizing the ferrous iron to ferric iron while simultaneously reducing the chromium(VI) to chromium (III); hydrolyzing the ferric iron and chromium(III); and forming a Fe(III)- and Cr(III)-oxyhydroxide coating on the carrier material particles.

15. The method according to claim 13, wherein a single reactor vessel is used for all steps of separating dissolved heavy metal ions from the wastewater.

16. The method according to claim 15, wherein the step of separating the coated carrier material particles from the wastewater includes continuously removing the particles through an outlet in the reactor vessel as the particles achieve metal-containing hydroxide coatings of a suitable thickness.

* * * * *